(12) United States Patent
Zhang

(10) Patent No.: US 12,507,054 B2
(45) Date of Patent: Dec. 23, 2025

(54) CONTROL METHOD AND APPARATUS FOR OBTAINING EMERGENCY SERVICE, TERMINAL, AND READABLE STORAGE MEDIUM

(71) Applicant: VIVO MOBILE COMMUNICATION CO., LTD., Guangdong (CN)

(72) Inventor: Yanxia Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 411 days.

(21) Appl. No.: 18/148,493

(22) Filed: Dec. 30, 2022

(65) Prior Publication Data

US 2023/0137356 A1   May 4, 2023

Related U.S. Application Data

(63) Continuation of application No. PCT/CN2021/105403, filed on Jul. 9, 2021.

(30) Foreign Application Priority Data

Jul. 9, 2020  (CN) .......................... 202010658650.0

(51) Int. Cl.
*H04W 4/90* (2018.01)
*H04W 48/18* (2009.01)

(52) U.S. Cl.
CPC .............. *H04W 4/90* (2018.02); *H04W 48/18* (2013.01)

(58) Field of Classification Search
CPC ................................ H04W 4/90; H04W 48/18
(Continued)

(56) References Cited

U.S. PATENT DOCUMENTS

| 2007/0054664 A1* | 3/2007 | Kim | H04W 4/90 |
| | | | 455/435.2 |
| 2012/0231760 A1* | 9/2012 | Zhu | H04W 76/50 |
| | | | 455/404.1 |

(Continued)

FOREIGN PATENT DOCUMENTS

| CN | 101730036 A | 6/2010 |
| CN | 103430579 A | 12/2013 |

(Continued)

OTHER PUBLICATIONS

Qualcomm Incorporated (rapporteur), Report for email discussion [107#40][NR/NPN] SIB1 design (Qualcomm), Private Network Support for NG-RAN, Discussion, 3GPP TSG-RAN WG2 Meeting #107bis, R2-1913633, Oct. 14-18, 2019, Chongqing, China.

(Continued)

*Primary Examiner* — Maria El-Zoobi
(74) *Attorney, Agent, or Firm* — Price Heneveld LLP

(57) ABSTRACT

This application discloses a control method and apparatus for obtaining an emergency service, a terminal, and a readable storage medium. The method includes: obtaining access control information provided by a cell, where the access control information is used to indicate whether a terminal working in a target network mode is supported in obtaining the emergency service; and in a case that a network mode in which the terminal works matches the target network mode and that the access control information indicates that the terminal working in the target network mode is supported in obtaining the emergency service, determining that the cell is a cell in which the emergency service is available.

20 Claims, 3 Drawing Sheets

(58) Field of Classification Search
USPC .................................................. 455/404.1
See application file for complete search history.

(56) References Cited

U.S. PATENT DOCUMENTS

| | | | | |
|---|---|---|---|---|
| 2013/0252573 | A1* | 9/2013 | Dong | ............... H04W 4/90 455/404.1 |
| 2017/0289783 | A1 | 10/2017 | Bergius et al. | |
| 2019/0053028 | A1 | 2/2019 | Chandramouli et al. | |
| 2020/0396792 | A1* | 12/2020 | Tiwari | ........... H04W 36/0085 |
| 2023/0080088 | A1* | 3/2023 | Liang | ................. H04L 9/40 370/329 |

FOREIGN PATENT DOCUMENTS

| | | |
|---|---|---|
| CN | 107079274 A | 8/2017 |
| CN | 111034233 A | 4/2020 |
| CN | 111182593 A | 5/2020 |
| CN | 113141607 A | 7/2021 |
| GB | 201914403 | 4/2021 |
| JP | 2017535992 A | 11/2017 |
| JP | 2023511094 A | 3/2023 |
| WO | 2011157115 A2 | 12/2011 |
| WO | 2018157584 A1 | 9/2018 |
| WO | 2019030430 A1 | 2/2019 |
| WO | 2021143404 A1 | 7/2021 |

OTHER PUBLICATIONS

Ericsson, Support of emergency calls in NPN-only cells, Discussion, Decision, 3GPP TSG-RAN WG2 #109 electronic, Tdoc R2-2000132, Feb. 24-Mar. 6, 2020, Elbonia.

Qualcomm Incorporated, Support for emergency services in SNPN, Discussion/Approval, SA WG2 Meeting #136AH, S2-2000817, Jan. 13-17, 2020, Incheon, Republic of Korea.

Ericsson, "SIB1 design for NPN", 3GPP TSG-RAN WG2 #108, R2-1914628, Nov. 18-22, 2019, Reno, USA.

Charter Communications, "Emergency call support for Standalone NPN", SA WG2 Meeting #S2-131, S2-1901775, Feb. 25-Mar. 1, 2019, Santa Cruz.

Qualcomm Incorporated, Ericsson, Nokia, Nokia Shanghai Bell, ZTE, "Support for emergency services in SNPN", SA WG2 Meeting #139E, S2-2004359, Jun. 1-12, 2020, Electronic Meeting.

China Telecom, "Status Report to TSG", 3GPP TSG RAN meeting #88, RP-200732, Jun. 29-Jul. 3, 2020, Electronic Meeting.

China Mobile, "KI #3: New solution: PLMN assisted IMS voice service for SNPN", SA WG2 Meeting #S2-139E, S2-2004362, Jun. 1-12, 2020, Electronic Meeting, Elbonia.

* cited by examiner

Terminal

Terminal

CONTROL METHOD AND APPARATUS FOR OBTAINING EMERGENCY SERVICE, TERMINAL, AND READABLE STORAGE MEDIUM

CROSS-REFERENCE TO RELATED APPLICATIONS

This application is a continuation application of PCT International Application No. PCT/CN2021/105403 filed on Jul. 9, 2021, which claims priority to Chinese Patent Application No. 202010658650.0, filed in China on Jul. 9, 2020, both of which are incorporated herein by reference in its entirety.

TECHNICAL FIELD

This application relates to the field of communication technologies, and specifically, to a control method and apparatus for obtaining an emergency service, a terminal, and a readable storage medium.

BACKGROUND

At present, in a case that a network side indicates that an emergency service is available in a cell, because the terminal is unable to distinguish which network provides the emergency service, user equipment (UE) needs to make unnecessary attempts, thereby failing to obtain the emergency service in time.

SUMMARY

According to a first aspect, a control method for obtaining an emergency service, applied to a terminal, is provided, where the method includes: obtaining access control information provided by a cell, where the access control information is used to indicate whether a terminal working in a target network mode is supported in obtaining the emergency service; and in a case that a network mode in which the terminal works matches the target network mode, determining that the cell is a cell in which the emergency service is available.

According to a second aspect, a control apparatus for obtaining an emergency service is provided, including: an obtaining module, configured to obtain access control information provided by a cell, where the access control information is used to indicate whether a terminal working in a target network mode is supported in obtaining the emergency service; and a first determining module, configured to: in a case that a network mode in which the terminal works matches the target network mode, determine that the cell is a cell in which the emergency service is available.

According to a third aspect, a terminal is provided, where the terminal includes a processor, a memory, and a program or instructions stored on the memory and capable of running on the processor, and when the program or instructions are executed by the processor, the steps of the method according to the first aspect are implemented.

According to a fourth aspect, a network-side device is provided, where the network-side device includes a processor, a memory, and a program or instructions stored on the memory and capable of running on the processor, and when the program or instructions are executed by the processor, the steps of the method according to the first aspect are implemented.

According to a fifth aspect, a readable storage medium is provided, where the readable storage medium stores a program or instructions, and when the program or instructions are executed by a processor, the steps of the method according to the first aspect are implemented.

According to a sixth aspect, a chip is provided, where the chip includes a processor and a communication interface, where the communication interface is coupled to the processor, and the processor is configured to run a program or instructions to implement the method according to the first aspect.

DESCRIPTION OF EMBODIMENTS

Figure 1:
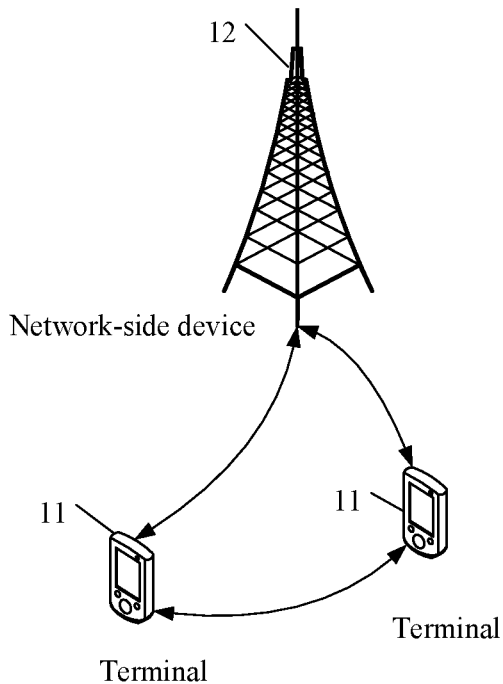
FIG. 1 shows a block diagram of a wireless communication system to which an embodiment of this application may be applied.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and the claims of this application, the terms "first", "second", and so on are intended to distinguish between different objects but do not indicate a particular order of the objects. It should be understood that data used in this way is used interchangeably in appropriate circumstances so that the embodiments of this application can be implemented in other orders than the order illustrated or described herein. In addition, "first" and "second" are usually used to distinguish objects of a same type but do not restrict a quantity of objects. For example, there may be one or a plurality of first objects. In addition, in this specification and claims, "and/or" represents at least one of connected objects, and the symbol "/" generally represents an "or" relationship between the associated objects.

First of all, terms in this application are introduced accordingly:

(1) Non-Public Network (NPN);

In an industrial environment, many applications (such as manufacturing and automation control) have high performance requirements, such as low latency and high reliability. Under a local network, increase of equipment density makes these performance requirements difficult to meet. However, wireless links can be used instead of traditional wired links, and a LAN-type private communication service can be provided for such vertical industries through 5G communication network to satisfy communication needs of the vertical industries.

At present, 3GPP agrees to adopt the following two non-public network NPN deployment modes to support vertical industry communication applications. The first mode is standalone NPN (SNPN) deployment that is independent of a public network, and a non-public network identifier (such as SNPN ID) provided by a network side is used, so that a user terminal (User Equipment, UE) can determine whether to camp on a network. For example, a conventional UE (such as UE that does not support SNPN access) cannot normally camp on a cell corresponding to the SNPN network, and SNPN UE cannot normally camp on a cell corresponding to the public land mobile network (PLMN) network. UE having SNPN capability can work in an SNPN mode or work in a PLMN mode. UE working in the SNPN mode can access a network only through an SNPN. UE working in the PLMN mode can access a network only through a PLMN.

The second mode is non-standalone NPN deployment (Public Network Integrated NPN, PNI-NPN) dependent on a public network. In this deployment scenario, a concept of closed access group (CAG) is introduced, so as to control the UE to access a specific cell. For example, a CAG to which the UE belongs is indicated if the UE subscribes to an NPN service, and a cell provides a CAG identifier supported by the cell, to help the UE to determine whether it can access a cell. If an access group to which the UE belongs is CAG1, and access groups supported by a cell are CAG1 and CAG2, the UE can determine that the cell is accessible. If an access group that can only be supported by a cell is CAG2, the UE can determine that the cell is inaccessible.

(2) RAN Sharing;

Wireless access network (RAN) sharing means that a plurality of operators share a same wireless access network. In a non-public network deployment scenario, a non-public network (for example, a network identified by SNPN ID) and a public network (for example, a network identified by PLMN ID) may share a wireless access network. A maximum of 12 networks can be shared in NR (for example, a network identified by PLMN ID and/or a network identified by SNPN ID and/or a network identified by PLMN ID+CAG ID).

It should be noted that the technologies described in the embodiments of this application are not limited to long term evolution (LTE)/LTE-Advanced (LTE-A) systems, and may also be used in other wireless communication systems, such as code division multiple access (CDMA), time division multiple access (TDMA), frequency division multiple access (FDMA), orthogonal frequency division multiple access OFDMA), single-carrier frequency-division multiple access (SC-FDMA), and other systems. The terms "system" and "network" used in the embodiments of this application are often used interchangeably, and the technologies described herein may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, for example a 6th generation (6G) communication system.

FIG. 1 shows a block diagram of a wireless communication system to which an embodiment of this application may be applied. The wireless communication system includes a terminal 11 and a network-side device 12. The terminal 11 may also be referred to as a terminal device or user terminal (User Equipment, UE). The terminal 11 may be a terminal-side device such as a mobile phone, a tablet personal computer, a laptop computer (or referred to as a notebook computer), a personal digital assistant (PDA), a palmtop computer, a netbook, an ultra-mobile personal computer (UMPC), a mobile Internet device (MID), a wearable device or vehicle user equipment (VUE), and a pedestrian user equipment (PUE), where a wearable device includes a bracelet, a headset, glasses, and the like. It should be noted that a specific type of the terminal 11 is not limited in the embodiment of this application. The network-side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or some other appropriate terms in the art. As long as the same technical effect is achieved, the base station is not limited to a specific technical term. It should be noted that a base station in the NR system is taken only as an example in the embodiments of this application, but a specific type of the base station is not limited.

The following describes in detail the control method for obtaining an emergency service provided in the embodiments of this application through specific embodiments and application scenarios thereof with reference to the accompanying drawings.

Figure 2:
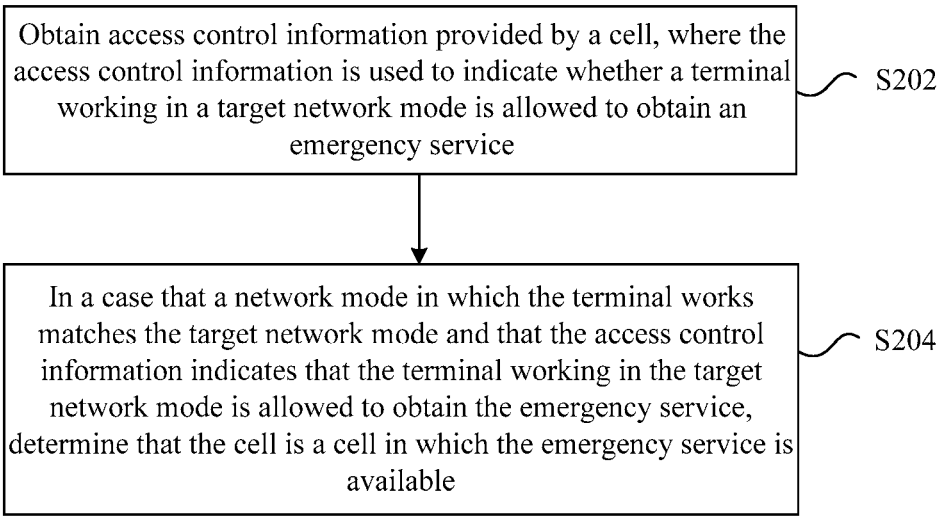
FIG. 2 is a flowchart of a control method for obtaining an emergency service according to an embodiment of this application.

FIG. 2 is a flowchart of a control method for obtaining an emergency service according to an embodiment of this application, where the method is applied to a terminal. As shown in FIG. 2, the method includes the following steps:

Step S202. Obtain access control information provided by a cell, where the access control information is used to indicate whether a terminal working in a target network mode is supported in obtaining the emergency service; and Step S204. In a case that a network mode in which the terminal works matches the target network mode and that the access control information indicates that the terminal working in the target network mode is supported in obtaining the emergency service, determine that the cell is a cell in which the emergency service is available.

It can be learned from the foregoing Step S202 and Step S204 that in a case that the target network mode indicated by the access control information provided by the cell matches the network mode in which the terminal works and the access control information indicates that the terminal working in the target network mode is supported in obtaining the emergency service, the terminal can determine that the cell is a cell in which the emergency service is available. In other words, the terminal can quickly distinguish whether the emergency service is available according to the access control information provided by the cell. This prevents the terminal from making unnecessary attempts and solves a problem in the prior art that the terminal cannot obtain an emergency service in time due to inability of the terminal to distinguish which network provides the emergency service.

Optionally, in another optional implementation of the embodiments of this application, in a case that the network mode in which the terminal works does not match the target network mode or that the access control information indicates that the terminal working in the target network mode is not supported in obtaining the emergency service, it is determined that the cell is a cell in which the emergency service is not available. In other words, the terminal may determine, according to the access control information, whether an emergency service can be initiated in the cell.

Further, in the embodiment of this application, in a case that the network mode in which the terminal works does not match the target network mode or that the access control information indicates that the terminal working in the target network mode is not supported in obtaining the emergency service, the cell is disabled.

It should be noted that, in the embodiment of this application, the terminal working in the target network mode is a terminal in a limited service state.

Optionally, in the embodiment of this application, the target network mode may include a standalone non-public network SNPN mode and a public land mobile network PLMN mode. Further, in the embodiment of this application, the terminal working in the SNPN mode may include a terminal having SNPN capability and working in the SNPN mode; and the terminal working in the PLMN mode may include a terminal having SNPN capability and working in the PLMN mode, a terminal having closed access group CAG capability, and a terminal having neither SNPN capability nor CAG capability. It should be understood that the SNPN capability of the terminal is equivalent to SNPN access capability, and the CAG capability is equivalent to CAG access capability.

It should be noted that the terminal having neither SNPN capability nor CAG capability is a conventional terminal.

Optionally, a type of the cell in the embodiment of this application includes at least one of the following:
(1) a cell that supports PLMN and SNPN access, that is, a cell providing access to PLMN and SNPN, for example, a cell providing access to one or more public networks (a public network is identified by PLMN ID) and one or more standalone non-public networks (a standalone non-public network is identified by SNPN ID);
(2) a cell that supports SNPN, PLMN, and closed access group CAG access, that is, a cell providing access to SNPN, PLMN, and CAG, for example, a cell providing access to one or more public networks (identified by PLMN ID), one or more standalone non-public networks (identified by SNPN ID), and one or more non-standalone non-public networks (identified by PLMN ID+CAG ID);
(3) a cell that supports SNPN and CAG access, that is, a cell providing access to SNPN and CAG, for example, a cell providing access to one or more standalone non-public networks (identified by SNPN ID) and one or more non-standalone non-public networks (identified by PLMN ID+CAG ID); or
(4) a cell that supports SNPN access, that is, a cell providing access to SNPN, for example, a cell providing access to one or more non-public networks (identified by SNPN ID).

Optionally, the access control information in the embodiment of this application includes at least one of the following: first indication information and second indication information, where the first indication information is used to indicate whether the terminal working in the SNPN mode is supported in obtaining the emergency service; and the second indication information is used to indicate whether the terminal working in the PLMN mode is supported in obtaining the emergency service.

The following describes using the first indication information as an example;

The first indication information may be indication information per cell, for example, indication information per cell (for example, one bit indication information) carried in SIB1, where a value of the indication information being "1" indicates that the UE working in the SNPN mode is supported in obtaining the emergency service from the cell, and a value of the indication information being "0" indicates that the UE in the SNPN mode is not supported in obtaining any emergency service from the cell. Alternatively, SIB1 having or carrying indication information per cell (for example, one bit indication information) indicates that UE working in the SNPN mode is supported in obtaining the emergency service from the cell, and SIB1 having or carrying no indication information per cell (for example, first bit indication information) indicates that the UE in the SNPN mode is not supported in obtaining any emergency service from the cell. For example, if the first indication information is indication information per cell, in a case that none of standalone non-public networks sharing the cell can provide an emergency service, the network side sets the first indication information not to support the UE in the SNPN mode in obtaining the emergency service, otherwise, the network side sets the first indication information to support the UE in the SNPN mode in obtaining the emergency service. For example, a cell A may support access to two standalone non-public networks SNPN1 and SNPN2 (in other words, the two standalone non-public networks SNPN1 and SNPN2 share the cell A). In a case that neither SNPN1 nor SNPN2 supports provision of an emergency service, a network sets the first indication information not to support the UE in the SNPN mode in obtaining the emergency service. For example, in a case that the first indication information is one bit indication information, the one bit is set to "0"; Alternatively, the first indication information is not carried; or, the first indication information may be further indication information per SNPN, for example, one bit indication information or a bitmap, where each bit in the bitmap corresponds to a standalone non-public network. In a specific application scenario, if a cell 1 supports access to SNPN1 and SNPN2 standalone non-public networks, there is one piece of indication information for each standalone non-public network (such as SNPN1). A value of the indication information being "1" indicates that the corresponding standalone non-public network (such as SNPN 1) can provide an emergency service, and the UE in the SNPN mode can obtain an emergency service through the standalone non-public network. A value of the indication information being "0" indicates that the corresponding standalone non-public network (such as SNPN 1) does not provide an emergency service, and the UE in the SNPN mode cannot obtain an emergency service through the standalone non-public network. Alternatively, provision (for example, indication information is present in SIB1) of the indication information per SNPN (for example, one bit indication information) by a network side indicates that the corresponding standalone non-public network (such as SNPN 1) can provide an emergency service, and the UE in the SNPN mode can obtain the emergency service through the standalone non-public network, and no provision (no indication information is present in SIB1) of indication information per SNPN (for example, one bit indication information) by a network indicates that the corresponding standalone non-public network (such as SNPN 1) does not provide an emergency service, and the UE in the SNPN mode cannot obtain an emergency service from the standalone non-public network.

For the second indication information, in a specific application scenario, bit information may be used to indicate whether an emergency service is available, where a way for obtaining the emergency service is similar to that for the first indication information. Details are not described herein.

The terminal in the embodiment of this application may determine, based on the first indication information, whether an emergency service can be initiated in the cell, where the emergency service can be initiated in the following manners:

(1) In a case that access control indication information obtained indicates that the cell supports obtaining the emergency service by the UE in the SNPN mode, if the UE is in the SNPN mode (for example, UE in a limited service mode), the UE determines that the UE can obtain the emergency service from the cell. For example, when indication information per cell is provided (for example, carried in SIB1) at a network side and the indication information indicates that the cell is available to provide the emergency service to the UE in the SNPN mode, the UE in the SNPN mode determines that the UE can obtain the emergency service from the cell. Alternatively, when indication information per SNPN is provided (for example, indication information is present in SIB1) by the network side, and at least one piece of indication information indicates that corresponding standalone non-public network supports an emergency service, the UE in the SNPN mode determines that the UE can obtain the emergency service from the cell.

(2) In a case that access control indication information obtained indicates that the cell only supports obtaining the emergency service by the UE in the SNPN mode, if the UE is in the PLMN mode, the UE (for example, UE in a limited service mode) determines that the UE cannot obtain the emergency service from the cell.

(3) In a case that access control indication information obtained indicates that the cell only supports obtaining the emergency service by the UE in the PLMN mode, if the UE is in the SNPN mode, the UE (for example, UE in a limited service mode) determines that the UE cannot obtain the emergency service from the cell.

Optionally, steps of the method in the embodiment of this application may further include: in a case that a network mode in which the terminal works matches the target network mode and that the access control information indicates that the terminal working in the target network mode is supported in obtaining the emergency service, determining that the cell in which the emergency service is available is a candidate cell for cell selection or reselection. Further, it may also be determined that the cell in which an emergency service is available is a high-priority candidate cell for cell selection or reselection. In other words, if there are a plurality of candidate cells (for example, including a cell in which an emergency service is available and a cell in which an emergency service is unavailable), a cell in which an emergency service is available may be preferably selected as a candidate cell for cell selection or reselection.

Optionally, in the embodiment of this application, a manner for obtaining access control information provided by a cell in step S202 may further include obtaining, through an access stratum, the access control information provided by the cell.

Based on this, after the obtaining, through an access stratum, access control information provided by a cell, the method in the embodiment of this application further includes forwarding the access control information to a non-access stratum through the access stratum.

Based on this, after the obtaining, through an access stratum, access control information provided by a cell, the method in the embodiment of this application further includes forwarding network identification information to the non-access stratum through the access stratum, where the network identification information is used to identify a target network corresponding to the access control information.

It should be noted that, there may be one network identifier indicated by the network identification information, such as above indication by the indication information per cell; and there may be a plurality of network identifiers indicated by the network identification information. For example, a cell A may support access to standalone non-public networks SNPN1 and SNPN2. If the first indication information is the indication information per cell, when the access stratum forwards the first indication information to the non-access stratum, the access stratum further inputs network identifiers, that is, network identifiers corresponding to SNPN 1 and SNPN 2 networks, corresponding to the first indication information. Alternatively, if the first indication information is the indication information per SNPN, when the access stratum forwards the first indication information to the non-access stratum, a network identifier corresponding to the first indication information is also input, for example, a network identifier corresponding to SNPN 1 network.

A manner of forwarding the access control information and network identification information to a non-access stratum through the access stratum may be specifically as follows:

(1) The UE AS forwards to the UE NAS the access control indication information obtained from the cell and the standalone non-public network identifier (such as SNPN ID) corresponding to the indication information, where, this manner corresponds to the indication information per SNPN.

(2) The UE AS forwards to the UE NAS the access control indication information obtained from the cell and all standalone non-public network identifiers (such as SNPN ID) corresponding to the cell, where, this manner corresponds to the indication information per cell.

Optionally, in a case that the network identification information is used to identify the target network mode corresponding to the access control information, when an emergency service is initiated through the non-access stratum, the method in the embodiment of this application may further include: in a case that the access control information indicates that the terminal working in the target network mode is supported in obtaining the emergency service, that a network mode in which the terminal works matches the target network mode, and that a network selected or registered by the terminal does not match the target network identified by the network identification information, selecting, through the non-access stratum, the target network identified by the network identification information.

In a case that the access control information is indication information per SNPN, in a specific application scenario, a manner of initiating an emergency service through the non-access stratum may further be: In a case that access control indication information obtained (the indication information corresponds to standalone non-public network SNPN1) indicates that the cell supports the UE in the SNPN mode to obtain the emergency service, and SNPN (for example, the SNPN selected or registered by UE is SNPN2) selected or registered by the UE in the SNPN mode does not match the standalone SNPN (for example, SNPN1) corresponding to the access control indication information, a UE NAS stratum implements SNPN selection. For example, based on access control indication information obtained, the UE selects a standalone non-public network that supports the UE in the SNPN mode to obtain the emergency service.

For example, the UE NAS implements the SNPN selection to select the standalone non-public network SNPN1.

Optionally, in a case that the network identification information is used to identify all target network modes corresponding to the cell, when an emergency service is initiated through the non-access stratum, the method in the embodiment of this application further includes: in a case that the access control information indicates that the terminal working in the first target network mode is not supported in obtaining the emergency service, that a network mode of the terminal matches the first target network mode, and that a network selected or registered by the terminal does not match the first target network identified by the network identification information, selecting a second target network through the non-access stratum, where access control information corresponding to the second target network indicates that the terminal working in the first target network mode is supported in obtaining the emergency service.

In a case that the access control information is indication information per SNPN, in a specific application scenario, a manner of initiating an emergency service through the non-access stratum may further be: In a case that access control indication information obtained indicates that the cell does not support obtaining the emergency service by the UE in the SNPN1 mode, and the SNPN selected by the UE in the SNPN1 mode matches the standalone SNPN1 corresponding to the access control indication information, the UE NAS stratum implements SNPN selection. For example, if the SNPN selected by the UE in the SNPN mode is SNPN1, and indication information obtained indicates that SNPN1 does not support provision of the emergency service, the UE implements SNPN selection. For example, based on access control indication information obtained, the UE selects a standalone non-public network that supports obtaining the emergency service by the UE in the SNPN mode. For example, when the access control indication information obtained by UE indicates that SNPN2 can provide the emergency service, the UE NAS selects SNPN2.

According to the control method for obtaining an emergency service provided in this application, the terminal (such as UE in the SNPN mode) of the target type can determine, based on the access control information provided by the network side, whether the terminal of the target type is supported in obtaining the emergency service from the cell, to avoid unnecessary attempts and a failure in obtaining the emergency service in time.

It should be noted that the control method for obtaining an emergency service according to the embodiment of this application may be implemented by a control apparatus for obtaining the emergency service, or by a module for obtaining the emergency service in the control device. In the embodiment of this application, the control apparatus for obtaining the emergency service implementing the control method for obtaining an emergency service is used as an example for describing the control apparatus for obtaining the emergency service provided in the embodiment of this application.

Figure 3:
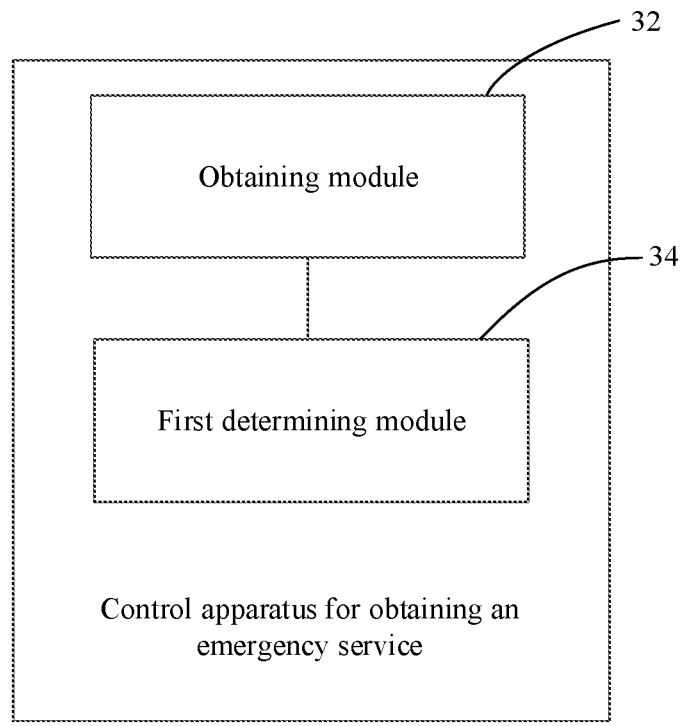
FIG. 3 is a schematic structural diagram of a control apparatus for obtaining an emergency service according to an embodiment of this application.

The embodiment of this application further provides a control apparatus for obtaining an emergency service. FIG. 3 is a schematic structural diagram of a control apparatus for obtaining an emergency service according to an embodiment of this application. As shown in FIG. 3, the apparatus includes:

an obtaining module 32, configured to obtain access control information provided by a cell, where the access control information is used to indicate whether a terminal working in a target network mode is supported in obtaining the emergency service; and a first determining module 34, configured to: in a case that a network mode in which the terminal works matches the target network mode and that the access control information indicates that the terminal working in the target network mode is supported in obtaining the emergency service, determine that the cell is a cell in which the emergency service is available.

Optionally, the apparatus in the embodiment of this application may further include: a second determining module, configured to: in a case that the network mode in which the terminal works matches the target network mode and that the access control information indicates that the terminal working in the target network mode is supported in obtaining the emergency service, determine that the cell in which the emergency service is available is a candidate cell for cell selection or reselection.

Optionally, in the embodiment of this application, the target network mode includes a standalone non-public network SNPN mode and a public land mobile network PLMN mode.

Optionally, in the embodiment of this application, the terminal working in the SNPN mode may include a terminal having SNPN capability and working in the SNPN mode; and the terminal working in the PLMN mode may include a terminal having SNPN capability and working in the PLMN mode, a terminal having closed access group CAG capability, and a terminal having neither SNPN capability nor CAG capability.

Optionally, the access control information in the embodiment of this application includes at least one of the following: first indication information or second indication information, where the first indication information is used to indicate whether the terminal working in the SNPN mode is supported in obtaining the emergency service; and the second indication information is used to indicate whether the terminal working in the PLMN mode is supported in obtaining the emergency service.

Optionally, in the embodiment of this application, a type of the cell includes at least one of the following: a cell that supports PLMN and SNPN access; a cell that supports SNPN, PLMN, and closed access group CAG access; a cell that supports SNPN and CAG access; or a cell that supports SNPN access.

Optionally, the obtaining module 32 in the embodiment of this application may be further configured to obtain, through an access stratum, access control information provided by the cell.

Optionally, the apparatus in the embodiment of this application may further include a first inputting module, configured to forward the access control information to a non-access stratum through the access stratum.

Optionally, the apparatus in the embodiment of this application may further include a second inputting module, configured to forward network identification information to the non-access stratum through the access stratum, where the network identification information is used to identify a target network corresponding to the access control information.

Optionally, in a case that the network identification information is used to identify the target network mode corresponding to the access control information, when an emergency service is initiated through the non-access stratum, the apparatus in the embodiment of this application may further include:

a first selecting module, configured to: in a case that the access control information indicates that the terminal working in the target network mode is supported in obtaining the emergency service, that a network mode in which the terminal works matches the target network mode, and that a network selected or registered by the terminal does not match the target network identified by the network identification information, select, through the non-access stratum, a target network identified by the network identification information.

Optionally, in a case that the network identification information is used to identify all target network modes corresponding to the cell, when an emergency service is initiated through the non-access stratum, the apparatus in the embodiment of this application may further include:

a second selecting module, configured to: in a case that the access control information indicates that the terminal working in a first target network mode is not supported in obtaining the emergency service, that a network mode of the terminal matches the first target network mode, and that a network selected or registered by the terminal matches a first target network identified by the network identification information, select a second target network through the non-access stratum, where access control information corresponding to the second target network indicates that the terminal working in the first target network mode is supported in obtaining the emergency service.

Optionally, the apparatus in the embodiment of this application may further include a third determining module, configured to: in a case that the network mode in which the terminal works does not match the target network mode indicated by the access control information or that the access control information indicates that the terminal working in the target network mode is not supported in obtaining the emergency service, determine that the cell is a cell in which the emergency service is not available.

Optionally, the apparatus in the embodiment of this application may further include a prohibiting module, configured to: in a case that the network mode in which the terminal works does not match the target network mode or that the access control information indicates that the terminal working in the target network mode is not supported in obtaining the emergency service, disable the cell.

It should be noted that, in the embodiment of this application, the terminal working in the target network mode is a terminal in a limited service state.

According to the control apparatus for obtaining the emergency service in this application, the terminal (such as UE in the SNPN mode) of the target type can determine, based on the access control information provided by the network side, whether the terminal of the target type is supported in obtaining the emergency service from the cell, to avoid unnecessary attempts and a failure in obtaining the emergency service in time.

In the embodiment of this application, the control apparatus for obtaining the emergency service may be an apparatus, or a component, an integrated circuit, or a chip in a terminal. The apparatus may be a mobile terminal or non-mobile terminal. For example, the mobile terminal may include but is not limited to a type of the terminal 11 above, and the non-mobile terminal may be a server, a network attached storage (NAS), a personal computer (PC), a television (TV), a teller machine, a self-service machine, or the like. This is not specifically limited in the embodiment of this application.

In the embodiment of this application, the control apparatus for obtaining the emergency service may be an apparatus having an operating system. The operating system may be an Android operating system, may be an iOS operating system, or may be another possible operating system. This is not specifically limited in the embodiment of this application.

The control apparatus for obtaining the emergency service according to the embodiment of this application can implement the processes implemented in the method embodiment in FIG. 2, with the same technical effects achieved. To avoid repetition, details are not described herein again.

Figure 4:
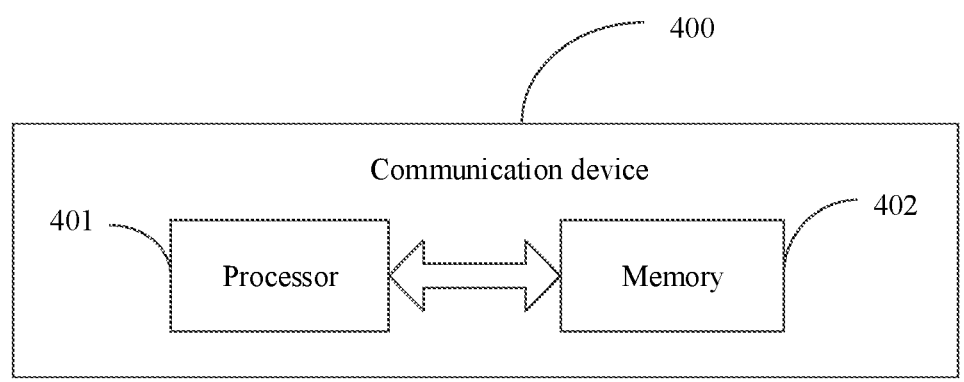
FIG. 4 is a schematic structural diagram of a communication device according to an embodiment of this application.

Optionally, as shown in FIG. 4, an embodiment of this application further provides a communication device 400, including a processor 401, a memory 402, and a program or instructions stored on the memory 402 and capable of running on the processor 401. For example, in a case that the communication device 400 is a terminal, the program or instructions are executed by the processor 401 to implement the processes of the foregoing embodiments of the control method for obtaining an emergency service, with the same technical effects achieved. In a case that the communication device 400 is a network-side device, the program or instructions are executed by the processor 401 to implement the processes of the foregoing embodiments of the control method for obtaining an emergency service, with the same technical effects achieved. To avoid repetition, details are not described herein again.

Figure 5:
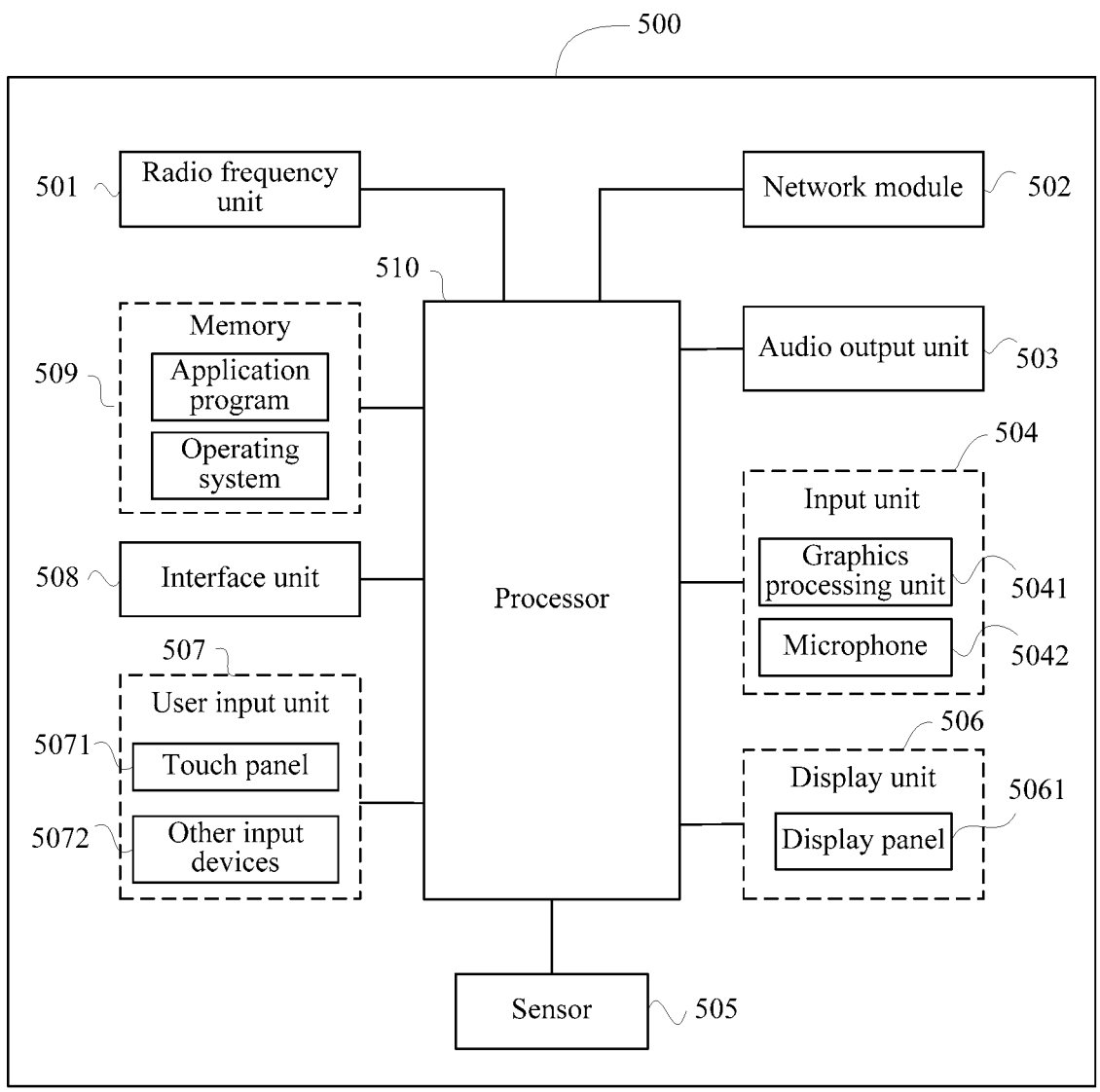
FIG. 5 is a schematic diagram of a hardware structure of a terminal according to an embodiment of this application.

FIG. 5 is a schematic diagram of a hardware structure of a terminal according to an embodiment of this application.

The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

A person skilled in the art can understand that the terminal 500 may further include a power supply (such as a battery) for supplying power to the components. The power supply may be logically connected to the processor 510 through a power management system. In this way, functions such as charge management, discharge management, and power consumption management are implemented through the power management system. The terminal structure shown in FIG. 5 does not constitute a limitation on the terminal. The terminal may include more or fewer components than shown in the figure, or some components may be combined, or there may be a different component arrangement. Details are not described herein again.

It should be understood that, in the embodiment of this application, the input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. The display unit 506 may include a display panel 5061. The display panel 5061 may be configured in a form of a liquid crystal display, an organic light-emitting diode, or the like. The user input unit 507 includes a touch panel 5071 and other input devices 5072. The touch panel 5071 is also referred to as a touch screen. The touch panel 5071 may include two parts: a touch detection apparatus and a touch controller. Specifically, the other input devices 5072 may include but are not limited to a physical keyboard, a functional button (such as a volume control button or a power on/off button), a trackball, a mouse, and a joystick. Details are not described herein again.

In the embodiments of this application, the radio frequency unit 501 sends downlink data received from a network-side device to the processor 510 for processing, and sends uplink data to the network-side device. Generally, the radio frequency unit 501 includes, but is not limited to, an antenna, at least one amplifier, a transceiver, a coupler, a low noise amplifier, a duplexer, and the like.

The memory 509 may be configured to store a software programs or instructions and various data. The memory 509 may mainly include a storage program or instruction area and a data storage area, where the storage program or instruction area may store an operating system, an application program or instructions required by at least one function (for example, an audio playing function and an image playing function), and the like. In addition, the memory 509 may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash storage device, or another volatile solid-state storage device.

The processor 510 may include one or more processing units. Optionally, the processor 510 may integrate an application processor and a modem processor. The application processor mainly processes an operating system, a user interface, an application program or instructions, and the like. The modem processor mainly processes wireless communication, for example, a baseband processor. It should be understood that alternatively, the modem processor may not be integrated into the processor 510.

The radio frequency unit 501 is configured to obtain access control information provided by a cell, where the access control information is used to control the terminal working in the target network mode to obtain the emergency service in the cell and indicate whether the terminal working in the target network mode is supported in obtaining the emergency service.

The processor 510 is configured to: in a case that a network mode in which the terminal works matches the target network mode and that the access control information indicates that the terminal working in the target network mode is supported in obtaining the emergency service, determine that the cell is a cell in which the emergency service is available.

In the embodiment of this application, the terminal of a specific type (such as UE in the SNPN mode) can determine, based on the access control information provided by the network side, whether the terminal of the target type is supported in obtaining the emergency service from the cell, to avoid unnecessary attempts and a failure in obtaining the emergency service in time.

An embodiment of this application further provides a readable storage medium, where the readable storage medium stores a program or instructions, and when the program or instructions are executed by a processor, the processes of the foregoing embodiments of the control method for obtaining an emergency service are implemented, with the same technical effects achieved. To avoid repetition, details are not described herein again.

The processor is a processor in the terminal in the foregoing embodiment. The readable storage medium includes a computer-readable storage medium such as a computer read-only memory (ROM), a random access memory (RAM), a magnetic disk, or an optical disc.

An embodiment of this application further provides a chip, where the chip includes a processor and a communications interface, the communication interface is coupled to the processor, and the processor is configured to run a program or instructions to implement the processes of the foregoing embodiments of the control method for obtaining an emergency service, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A control method for obtaining an emergency service, performed by a terminal and comprising:
   obtaining access control information provided by a cell, wherein the access control information is used to indicate whether a terminal working in a target network mode is supported in obtaining the emergency service; and in a case that a network mode in which the terminal works matches the target network mode and that the access control information indicates that the terminal working in the target network mode is supported in obtaining the emergency service, determining that the cell is a cell in which the emergency service is available;

characterized in that the target network mode comprises a standalone non-public network, SNPN, mode; and the access control information comprises: at least one piece of first indication information, each of which corresponding to a first SNPN, and the first indication information is used to indicate whether the terminal working in the SNPN mode is supported in obtaining the emergency service through the first SNPN.

2. The method according to claim 1, further comprising:

in a case that the network mode in which the terminal works matches the target network mode and that the access control information indicates that the terminal working in the target network mode is supported in obtaining the emergency service, determining that the cell in which the emergency service is available is a candidate cell for cell selection or reselection.

3. The method according to claim 1, wherein the target network mode further comprises a public land mobile network (PLMN) mode.

4. The method according to claim 3, wherein the terminal working in the SNPN mode comprises a terminal having SNPN capability and working in the SNPN mode; and the terminal working in the PLMN mode comprises at least one of:

a terminal having SNPN capability and working in the PLMN mode;

a terminal having closed access group (CAG) capability; or a terminal having neither SNPN capability nor CAG capability.

5. The method according to claim 4, wherein the access control information further comprises second indication information; wherein the second indication information is used to indicate whether the terminal working in the PLMN mode is supported in obtaining the emergency service.

6. The method according to claim 1, wherein a type of the cell comprises at least one of the following:

a cell that supports PLMN and SNPN access; a cell that supports SNPN, PLMN, and closed access group CAG access; a cell that supports SNPN and CAG access; or a cell that supports SNPN access.

7. The method according to claim 4, wherein the obtaining access control information provided by a cell comprises:

obtaining, through an access stratum, access control information provided by the cell.

8. The method according to claim 7, wherein, after the obtaining, through an access stratum, access control information provided by a cell, the method further comprises:

forwarding the access control information to a non-access stratum through the access stratum.

9. The method according to claim 8, wherein, after the obtaining, through an access stratum, access control information provided by a cell, the method further comprises:

forwarding network identification information to the non-access stratum through the access stratum, wherein the network identification information is used to identify a target network corresponding to the access control information.

10. The method according to claim 9, wherein in a case that the network identification information is used to identify the target network corresponding to the access control information, when an emergency service is initiated through the non-access stratum, the method further comprises:

in a case that the access control information indicates that the terminal working in the target network mode is supported in obtaining the emergency service, that a network mode in which the terminal works matches the target network mode, and that identification of a network selected or registered by the terminal does not match the target network identified by the network identification information, selecting, through the non-access stratum, the target network identified by the network identification information.

11. The method according to claim 9, wherein in a case that the network identification information is used to identify the target network corresponding to the access control information, when an emergency service is initiated through the non-access stratum, the method further comprises:

in a case that the access control information indicates that the terminal working in a first target network mode is not supported in obtaining the emergency service, that a network mode of the terminal matches the first target network mode, and that identification of a network selected or registered by the terminal matches the first target network identified by the network identification information, selecting a second target network through the non-access stratum, wherein access control information corresponding to the second target network indicates that the terminal working in the first target network mode is supported in obtaining the emergency service.

12. The method according to claim 1, further comprising:

in a case that the network mode in which the terminal works does not match the target network mode or that the access control information indicates that the terminal working in the target network mode is not supported in obtaining the emergency service, determining that the cell is a cell in which the emergency service is not available.

13. The method according to claim 12, further comprising:

in the case that a network mode in which the terminal works does not match the target network mode or that the access control information indicates that the terminal working in the target network mode is not supported in obtaining the emergency service, disabling the cell.

14. The method according to claim 1, wherein the terminal working in the target network mode is in a limited service state.

15. A terminal, comprising a processor, a memory, and instructions stored on the memory and capable of running on the processor, wherein when the instructions are executed by the processor, steps of a control method for obtaining an emergency service are implemented, the steps comprising:

obtaining access control information provided by a cell, wherein the access control information is used to indicate whether a terminal working in a target network mode is supported in obtaining the emergency service; and in a case that a network mode in which the terminal works matches the target network mode and that the access control information indicates that the terminal working in the target network mode is supported in obtaining the emergency service, determining that the cell is a cell in which the emergency service is available-;

characterized in that the target network mode comprises a standalone non-public network, SNPN, mode; and the access control information comprises: at least one piece of first indication information, each of which corresponding to a first SNPN, and the first indication information is used to indicate whether the terminal working in the SNPN mode is supported in obtaining the emergency service through the first SNPN.

16. The terminal according to claim 15, wherein the target network mode further comprises a public land mobile network (PLMN) mode.

17. The terminal according to claim 16, wherein the terminal working in the SNPN mode comprises a terminal having SNPN capability and working in the SNPN mode; and the terminal working in the PLMN mode comprises at least one of:

a terminal having SNPN capability and working in the PLMN mode;

a terminal having closed access group (CAG) capability; or a terminal having neither SNPN capability nor CAG capability.

18. The terminal according to claim 17, wherein the step of obtaining access control information provided by a cell comprises:

obtaining, through an access stratum, access control information provided by the cell.

19. The terminal according to claim 15, wherein the terminal working in the target network mode is in a limited service state.

20. A non-transitory readable storage medium, wherein the readable storage medium stores instructions, and when the instructions are executed by a processor, steps of a control method for obtaining an emergency service are implemented, the steps comprising:

obtaining access control information provided by a cell, wherein the access control information is used to indicate whether a terminal working in a target network mode is supported in obtaining the emergency service; and in a case that a network mode in which the terminal works matches the target network mode and that the access control information indicates that the terminal working in the target network mode is supported in obtaining the emergency service, determining that the cell is a cell in which the emergency service is available;

characterized in that the target network mode comprises a standalone non-public network, SNPN, mode; and the access control information comprises: at least one piece of first indication information, each of which corresponding to a first SNPN, and the first indication information is used to indicate whether the terminal working in the SNPN mode is supported in obtaining the emergency service through the first SNPN.

* * * * *